United States Patent

[11] 3,634,623

[72] Inventors Renville H. McMann, Jr.
New Canaan;
Donald W. Ridley, Stamford, both of Conn.
[21] Appl. No. 839,563
[22] Filed July 7, 1969
[45] Patented Jan. 11, 1972
[73] Assignee Columbia Broadcasting System, Inc.
New York, N.Y.

[54] INTERLACED-SCAN-DEVELOPING HALF-LINE-DELAY CIRCUIT
4 Claims, 4 Drawing Figs.

[52] U.S. Cl. .......... 178/69.5 F, 178/69.5 TV
[51] Int. Cl. .......... H04n 5/04
[50] Field of Search .......... 178/69.5 F, 69.5 TV, 7.3 S, 7.5 S; 307/232; 328/110, 139, 187

[56] References Cited

UNITED STATES PATENTS 3,182,122 5/1965 Kao .......... 178/7.3 S
3,422,223 1/1969 Scipione .......... 178/69.5 G

*Primary Examiner*—Robert L. Griffin
*Assistant Examiner*—George G. Stellar
*Attorney*—Brumbaugh, Graves, Donohue & Raymond

ABSTRACT: A vertical synchronization pulse separator first causes the vertical synchronization pulses to be removed from the composite signal. This signal, with the synchronization pulses removed, is subtracted from the composite signal by a differential amplifier which provides an input to a delaying device. The delaying device delays every second separated vertical synchronization pulse by a time interval equal to one-half interval between horizontal synchronization pulses. The delay of a vertical synchronization pulse causes the beginning of the horizontal lines traced on the screen thereafter to be displaced horizontally from the beginning of the horizontal lines preceded by an undelayed synchronization pulse by one-half the horizontal dimension of the screen, thereby producing an interlaced scan.

INVENTORS
RENVILLE H. McMANN, JR. &
DONALD W. RIDLEY
BY Brumbaugh, Graves, Donohue & Raymond
their ATTORNEYS INVENTORS
RENVILLE H. McMANN, JR. &
DONALD W. RIDLEY
BY Brumbaugh, Graves, Donohue & Raymond
their ATTORNEYS INVENTORS
RENVILLE H. McMANN, JR. &
DONALD W. RIDLEY
BY Brumbaugh, Graves, Donohue & Raymond
their ATTORNEYS

INTERLACED-SCAN-DEVELOPING HALF-LINE-DELAY CIRCUIT

BACKGROUND OF THE INVENTION

This invention relates to circuits for controlling the interlaced scanning of a screen and, more particularly, to a novel and highly effective circuit for separating vertical synchronization pulses from a composite video signal and utilizing these pulses to initiate the interlaced scanning of the frames on the screen.

A composite video signal includes both synchronization pulses and video information. The video information, as that term is used here, relates to the brightness of each element of detail contained in the image. The synchronizing pulses synchronize the scanning of the screen with the signal. In this way each portion of the video information is used to control the proper area of the screen and the signal can be translated, i.e., the desired image can be reproduced.

One function of an electronic video system which receives a broadcast signal or plays a tape or a photographic film on which a video signal is recorded is to separate the synchronization pulses which are part of the composite signal. In many instances the composite signal includes both vertical and horizontal synchronization pulses. In a system of the type which plays a photographic film, however, only the vertical synchronization pulses are conventionally included in the composite signal. In this instance, the horizontal synchronization pulses are generated by the reproducing apparatus itself. These horizontal synchronization pulses are used to control both the scanning of the film to generate the composite signal and the scanning of the screen to reproduce the image. In systems of all types, however, any synchronization pulses which do form part of the composite signal must be separated. In the past, this has been accomplished by generating synchronization pulses having an amplitude greater than the maximum amplitude of the video information. The composite signal is clipped to separate these pulses. Noise pulses having greater amplitude than the synchronization pulses are discriminated against by limiting or gating systems of this general type are disclosed in U.S. Pat. No. 3,333,058 issued to Peter C. Goldmark, et al. on July 25, 1967, and U.S. Pat. No. 3,402,260 issued to Peter C. Goldmark, et al. on Sept. 17, 1968.

Electronic devices which play a photographic film on which a video signal has been recorded conventionally generate the vertical synchronization pulses, which form part of the composite signal, by placing a light behind the film. To provide synchronization pulses with the amplitude superiority required by known synchronization pulse-separating techniques, it is necessary to use a light which, because of its brightness, generates undesired noise in the composite signal. It is difficult to eliminate this noise because the film used commonly has light transmissivity in the black areas of approximately 10 percent.

It is, of course, possible to reduce the brightness of the light placed behind the film, and to correspondingly reduce the amplitude range available for the remainder of the composite signal. This, however, leads to a reduction of the quality of the image produced.

It is preferable to use the separated synchronization pulses to develop an interlaced scan. This is known to produce an image of superior quality. In conventional systems which receive a broadcast signal, an interlaced scan is developed by the so-called "odd-line" method. According to this method, the time taken by the beam to move from the bottom to the top of the screen during the interval between successive fields is sufficient to allow the beam to oscillate horizontally an integral number of times plus one-half of a horizontal line. Thus, the synchronization pulses, which are uniformly spaced, produce an interlaced scan.

When the video system is of the type which plays a signal recorded on photographic film the odd-line method introduces undesirable errors and complications, due, for example, to slight variations in the speed at which the film is moved and to the stretching of some parts of the film. It is, therefore, particularly difficult to achieve an interlaced scan in this type of system.

SUMMARY OF THE INVENTION

It is an object of this invention to provide a new and improved apparatus which is capable of separating vertical synchronization pulses which do not have amplitude superiority and is further capable of delaying every other separated pulse so as to initiate interlaced scanning of the screen. It is a further object of this invention to provide an improved electronic video system having a screen scanned by an electron beam, including a vertical synchronization pulse separating and delaying apparatus which effectively overcomes the drawbacks of previously known systems described above.

The present invention incorporates a novel and improved system for separating vertical synchronization pulses that does not depend upon amplitude superiority. Accordingly, the amplitude range available to the portion of the signal representing video information is maximized in relation to the total amplitude range utilized by the composite signal.

An electronic video system, constructed in accordance with the invention, adapted to receive vertical synchronization pulses, horizontal synchronization pulses, and video information, and capable of translating a composite signal containing vertical synchronization pulses comprises a first means for removing the vertical synchronization pulses from the composite signal, a second means for subtracting the signal with the vertical synchronization pulses removed from the composite signal, the output of the second means being separated vertical synchronization pulses, and delay means for delaying every second vertical synchronization pulse. The first means may be responsive to the horizontal synchronization pulses and the delay means may cause a delay equal to approximately one-half the time interval between horizontal synchronization pulses. The second means may comprise a differential amplifier.

More specifically, an electronic video system, constructed in accordance with the invention, capable of playing a photographic film on which a composite signal containing vertical synchronization pulses has been recorded may comprise separating means for separating the vertical synchronization pulses from the composite signal by subtracting from the composite signal a signal from which the vertical synchronization pulses have been removed, and delay means for delaying every second vertical synchronization pulse arranged to receive the output of the separating means, the delay means having first and second outputs each having one-half the frequency of the synchronization pulses contained in the composite signal, the first output being in phase with every second of the pulses contained in the composite signal and the second output being out of phase with each of the vertical synchronization pulses contained in the composite signal. The system may further comprise differential amplifier output means responsive to the first and second outputs of the delay means.

BRIEF DESCRIPTION OF THE DRAWINGS

An understanding of additional aspects of the invention can be gained from a consideration of the following detailed description of a representative embodiment of the invention, in conjunction with the appended drawings, wherein.

DESCRIPTION OF THE PREFERRED EMBODIMENT

Figure 1:
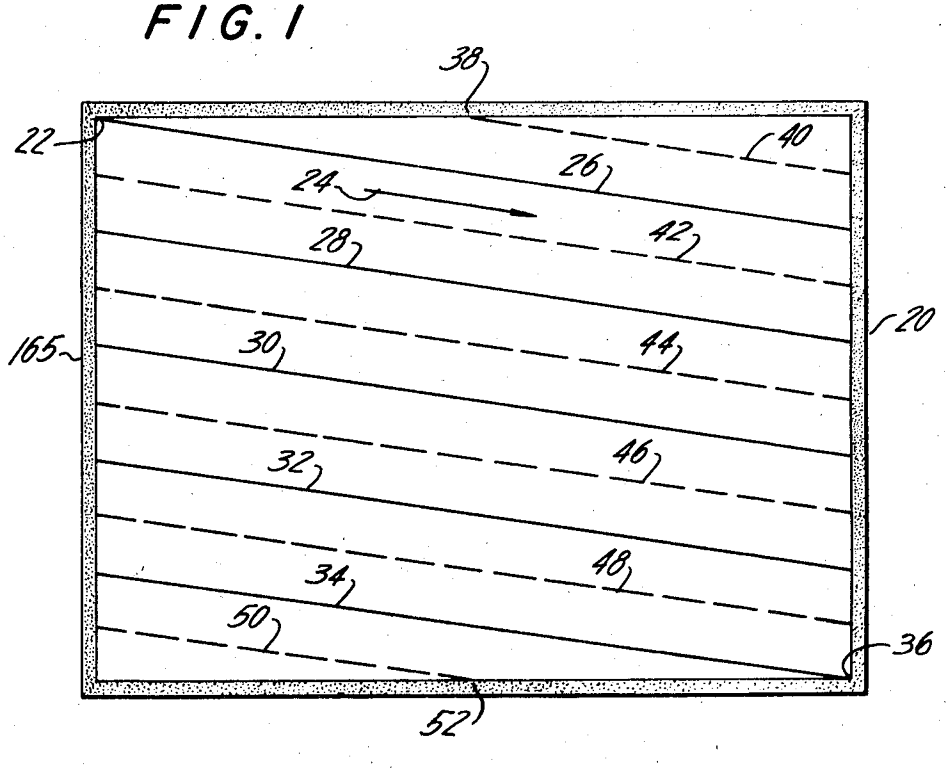
FIG. 1 is a schematic front elevation of a screen on which the lines of an interlaced scan have been drawn.

FIG. 1 shows an interlaced scanning pattern of a type used in conventional electronic video systems. The pattern is, of course, not drawn to scale. A radiant energy beam scans a screen, generally indicated by the reference numeral 20. It is assumed here that the scanning is initiated at the upper left-hand corner 22. The scan follows a straight line, in this case line 26, in the direction of an arrow 24 to the end of that line and then, in the case of an interlaced scan, returns to the beginning (left-hand end as seen in FIG. 1) of the solid line 28. The interlaced scan follows each solid line 28, 30, 32, 34, tracing each from left to right until the right-hand end of line 34 (as seen in FIG. 1) is reached at the lower right-hand corner 36.

At this point a vertical synchronization pulse causes the beam to scan from the top of the screen again in synchronization with the signal. If the vertical synchronization pulses were to arrive at uniform intervals the beam would return to the point 22 and follow the even numbered solid lines again unless the odd-line method was used. An interlaced scan would not be achieved.

The present invention produces an interlaced scan by causing every second vertical synchronization pulse to be delayed by one-half the time taken for the beam to scan one horizontal line. Because of the delay the beam will have moved across the top of the screen to the point 38 before the next vertical scan is initiated. Thus the next line scanned will be the broken line designated 40. The beam will again scan in the direction of the arrow 24 until reaching the right-hand end of line 40 (as shown in FIG. 1). The beam will then move to the other side of the screen scan each of the broken lines 42, 44, 46, 48 and 50 ending at the point designated 52.

Because the next synchronization pulse is not delayed the following vertical scan is again initiated at the point 22 and the following frame of information is then presented in the same manner as the first.

Figure 2:
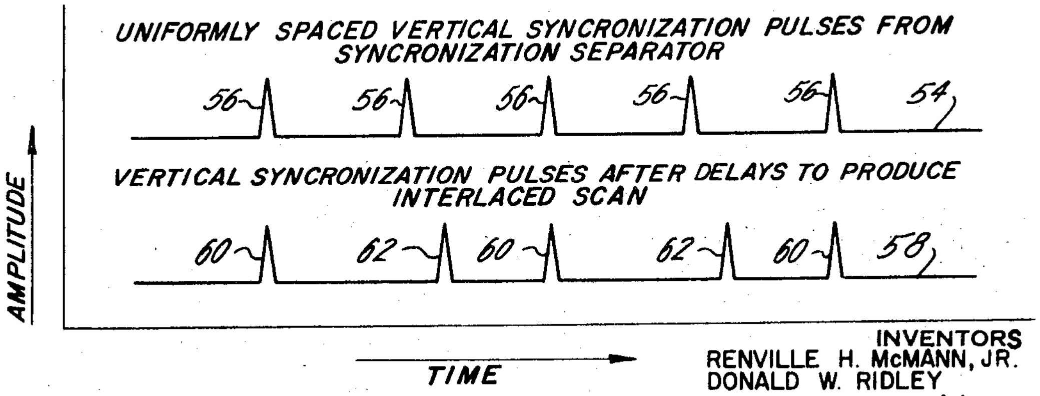
FIG. 2 is a graph of amplitude with respect to time showing vertical synchronization pulses before and after alternate pulses have been delayed by an interval equal to one-half the time required to scan a horizontal line.

FIG. 2 shows a signal 54 (not drawn to scale) containing uniformly spaced synchronization pulses 56 as originally derived from the composite signal. A signal 58 (not drawn to scale) shows the synchronization pulses after every second pulse has been delayed in accordance with the invention to produce an interlaced scan. Pulses 60 correspond, with respect to time, to the above pulses 56 represented directly thereabove and have not been delayed. Pulses 62 of the signal 58 are the pulses which have been delayed in accordance with the invention.

Figure 3:
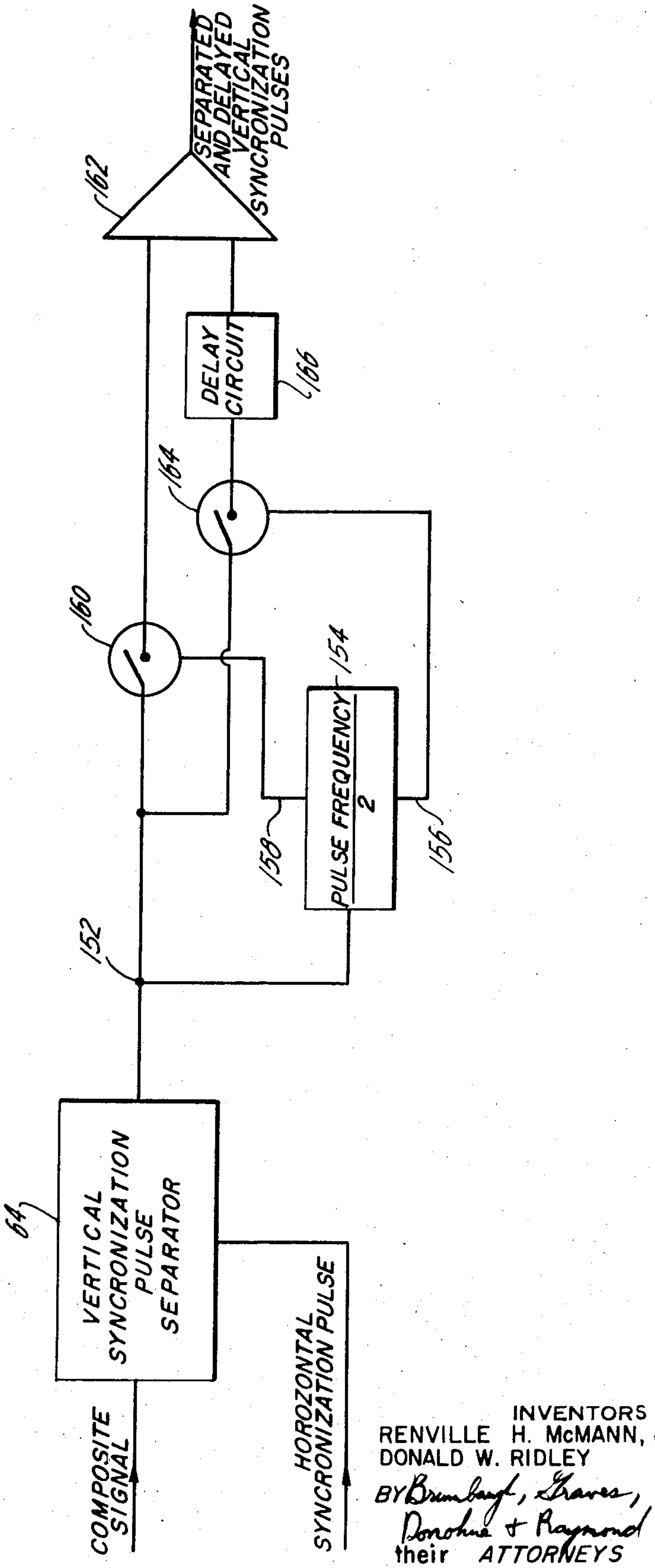
FIG. 3 is a circuit diagram of a preferred embodiment of an electrical circuit, constructed in accordance with the invention, for separating and delaying vertical synchronization pulses.

FIG. 3 is a schematic diagram of an apparatus constructed in accordance with the invention for producing the signal 58. A means for separating the vertical synchronization pulses from the composite signal by subtracting from the composite signal is a signal from which the vertical synchronization pulses have been removed is shown here as a vertical synchronization pulse separator 64. This circuit, which is disclosed and claimed separately in application Ser. No. 839,562 of Donald W. Ridley, filed July 7, 1969 directed to a "Vertical Synchronization Pulse Separator" is shown in FIG. 4 and will now be described in detail.

Figure 4:
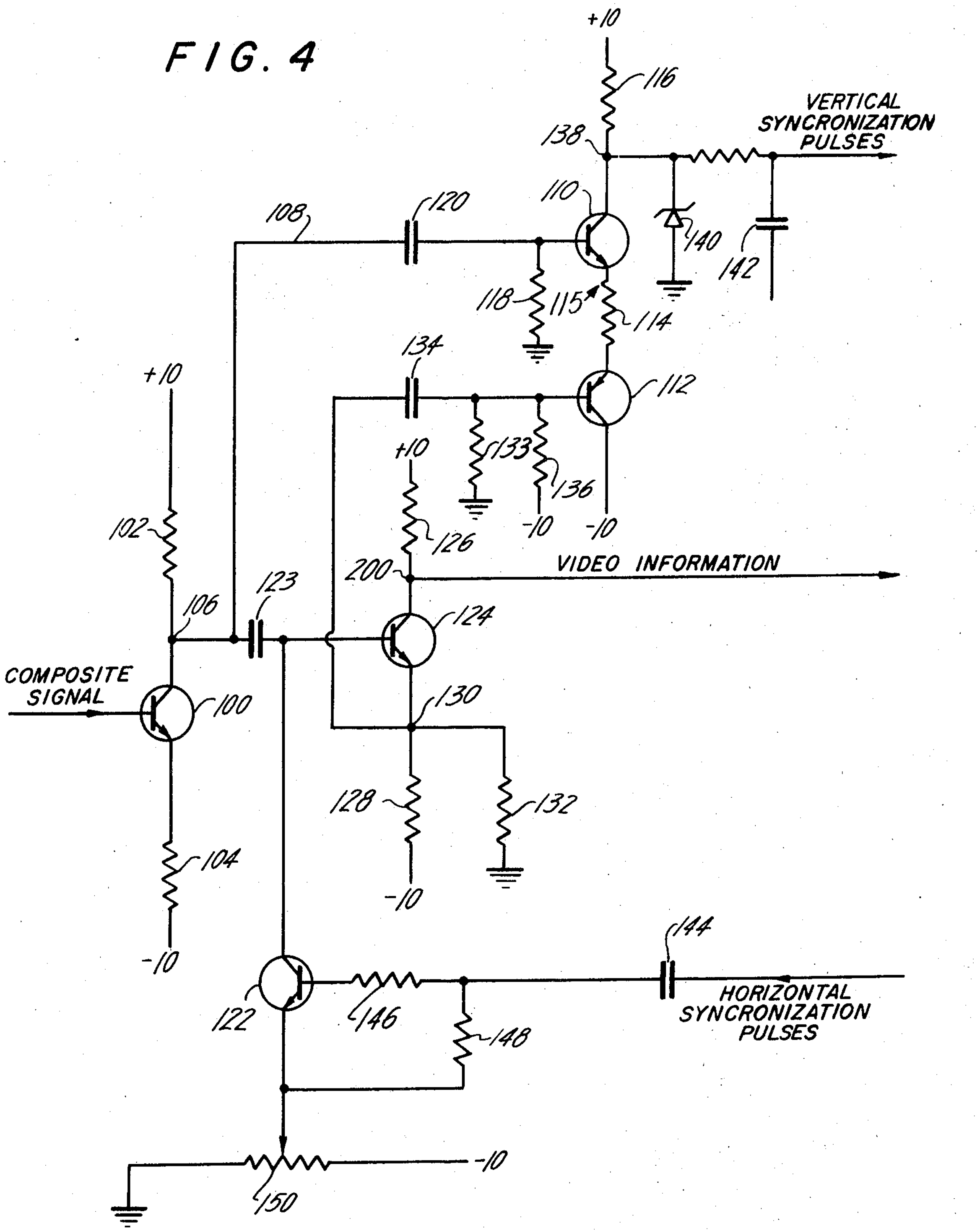
FIG. 4 is a diagram of a synchronization pulse separator circuit suitable for use in the circuit of FIG. 3.

The circuit of FIG. 4 is designed for an available potential of 20 volts (plus and minus 10 volts from ground). The composite signal, which is assumed to be negative, serves as an input to the base of a transistor 100. A resistor 102 is connected between the collector of transistor 100 and the positive lead of the 20-volt potential. A resistor 104 is connected between the emitter of transistor 100 and the negative lead of the 20-volt potential. Thus, resistors 102 and 104 establish the range of the collector-emitter current of transistor 100. A composite signal is drawn from a junction 106 between the transistor 100 and the resistor 102. Assuming that the input signal is negative, the parameters of transistor 100 are selected so that the positive white signals drawn from junction 106 vary up to +1 volt. It is noted again that the amplitude of the vertical synchronization pulses does not exceed the amplitude of the portion of the signal representing the video information.

The unclamped composite signal drawn from the junction 106 is applied, via a line 108, to the base of a first transistor 110. The emitter of the first transistor 110 and the emitter of a second transistor 112 are connected across a resistor 114 to form a differential amplifier 115 which receives, as a first input, the composite signal, including the vertical synchronization pulses from the video amplifier. An appropriate dropping resistor 116 is provided between the +10 volt lead and the collector of transistor 110. The transistors 100 and 110 are R-C coupled through a resistor 118 and a capacitor 120.

To provide a second input to the differential amplifier 115, another portion of the positive white signal drawn from the junction 106 is clamped by the operation of a first means for removing the synchronization pulses from the composite signal. The first means comprises a circuit means susceptible of forward bias and reverse bias and is arranged so that the portion of the composite signal produced when the circuit means is forward biased is not transmitted to the differential amplifier 115. In this embodiment the circuit means is shown as a transistor 122.

The signal clamped by the action of the transistor 122, which is also passed through a decoupling capacitor 123, is applied to the base of a transistor 124. The collector of transistor 124 is connected through a resistor 126 to the +10 volt lead. The emitter of transistor 124 is connected through resistor 128 to the negative lead. The resistors 126 and 128 are selected to provide an appropriate potential level for the positive white signal which is drawn at a junction 130 between the emitter of transistor 124 and resistor 128. This signal is grounded through a resistor 132.

As described above, the second input to the differential amplifier 115 is clamped by the action of the transistor 122. Accordingly, the transistor 122 is forward biased by the horizontal synchronization pulses which are applied to its base. The presence of a horizontal synchronization pulse forward biases the transistor 122 causing it to become conductive across its collection-emitter junction. Thus when a synchronization pulse is present, the transistor 122 provides an alternative path for the signal drawn from junction 106 and this portion of the composite signal supplied to the base of the transistor 100 is not included in the clamped input to the differential amplifier 115. The missing component of that signal is the vertical synchronization pulse. This vertical synchronization pulse is present in the composite signal supplied to the transistor 100 only when a horizontal synchronization pulse has forward biased transistor 122.

The clamped signal drawn differential the junction 130 is a positive white signal. The junction 130 is R-C coupled through a resistor 133 and a capacitor 134, to the base of transistor 112, which is connected to the −10-volt supply through a resistor 136. Thus, the clamped signal forms the second input received by the differential amplifier 115. It is subtracted from the unclamped positive white signal drawn from junction 106 which forms the first input. THus, the differential amplifier 115 generates a pulsed output corresponding to the vertical synchronization pulses. This output is drawn off at junction 138 and is clipped and filtered by a third means for maintaining the amplitude of the pulses of the pulsed output uniform. The third means comprises a zener diode 140 and a low-pass filter 142. The output is a clean separated vertical synchronization pulse even through the amplitude of this pulse was of smaller amplitude than the maximum amplitude of the video information portion of the composite signal.

The transistor 124 and the clamp, including the transistor 122, the capacitor 144, and the resistors 146 and 148, which are connected to the base of the transistor 122 to decouple the source of the horizontal synchronization pulses and to bias the transistor 124, are not extra components required by this invention but are required by a conventional video amplifier. Hence the invention can economically be incorporated in a conventional apparatus.

A variable resistor 150, which is connected to the emitter of the transistor 122 and to the −10-volt lead, is set in accordance with the desired quiescent point of the transistor 122.

The separated vertical synchronization pulses drawn from the junction 138 of the separating means described above are, of course, uniformly spaced. So that an interlaced scan may be developed, a delay means is provided for delaying every second vertical synchronization pulse. The delay means is arranged to receive the output of the separating means, corresponding to the output of pulse separator 64 in FIG. 3 drawn at a junction 152. The delay means will now be described.

The output of the separating means is supplied to a pulse-frequency divider 154. Every other pulse causes the divider to supply an output pulse to a lead 156. The remaining pulses cause corresponding output pulses to be supplied to a lead 158. Circuits of this type are well known in the art and therefore are not described in detail here.

The pulses emitted from the divider at the lead 158 operate a gate 160 so as to allow the corresponding pulses from the junction 152, which operated the divider, to be passed directly to a differential amplifier output means 162. These undelayed pulses correspond to the undelayed pulses 60 shown in FIG. 2. Every second pulse from the junction 152 causes the divider to emit a pulse at the lead 156 and not at the lead 158, thus operating a gate 164. Accordingly, pulses drawn from the junction 152 which cause pulses to be emitted at the lead 156 pass through the gate 164, the gate 160 being closed. These pulses pass through the delay circuit 166 before becoming an input to the differential amplifier output means 162 and correspond to the delayed pulses 62 in FIG. 2. Thus, the delay means produces two outputs which are supplied to the differential amplifier output means 162.

The pulses emitted by differential amplifier output means 162 can be used to produce the interlaced scan described above with respect to FIG. 1. The delay circuit 166 is selected so that the delay means causes a delay equal to approximately one-half the time interval between the horizontal synchronization pulses. This interval is sufficient to allow the radiant energy beam to move horizontally from the point 22 in FIG. 1 to the point 38 and is referred to as a half-line delay.

Thus, the delay means described above has first and second outputs each having one-half the frequency of the synchronization pulses contained in the composite signal, the first output being in phase with every second of the pulses contained in the composite signal and the second output being out of phase with each of the vertical synchronization pulses contained within the composite signal. The first output corresponds to the pulses 60 shown in FIG. 2 and the second output corresponds to the pulses 62 shown in FIG. 2.

By virtue of the apparatus described above, synchronization pulses that lack amplitude superiority can be separated from the composite signal and the time relationship of these pulses can be modified to produce an interlaced scan. The apparatus is simple and reliable and is particularly easily adapted for use with devices that play a video signal previously recorded on photographic film. The use of an interlaced scan in this type of device enables it to produce an image superior to that produced by other known devices.

The embodiment of the device described above is intended to be merely exemplary, and those skilled in the art will be able to make numerous variations and modifications of it without departing from the spirit and scope of the invention. For instance, a video information signal component of maximum amplitude could be made to correspond to black rather than white. Similarly, the polarity of the signal could be reversed at various points within the circuit. It is also apparent that the principles of the inventive concept could be applied to magnetic as well as photographic recordings.

We claim:

1. In an electronic video system capable of playing a film on which a composite signal containing vertical synchronization pulses has been recorded, a circuit for producing a series of vertical synchronization pulses that are evenly spaced to facilitate the development of an interlaced scan comprising separating means for separating vertical synchronization pulses present in the composite signal by subtracting from the composite signal a signal from which periodic portions containing the vertical synchronization pulses have been removed, and delay means for delaying every second vertical synchronization pulse arranged to receive the output of said separating means, said delay means having first and second outputs, each output having one-half the frequency of the synchronization pulses contained in the composite signal, said first output being in phase with every second of said pulses contained in the composite signal and said second output being out of phase with each of the vertical synchronization pulses contained within the composite signal, whereby the combined first and second outputs of the delayed means form the desired series of unevenly spaced vertical synchronization pulses.

2. The circuit of claim 1 wherein the separating means causes periodic portions of the composite signal to be removed in response to and in timed relation to horizontal synchronization pulses.

3. The circuit of claim 2 wherein the delay means causes a delay equal to approximately one-half the time interval between horizontal synchronization pulses.

4. The circuit of claim 1 in which the separating means includes a differential amplifier.

* * * * *

PO-1050
(5/69)

UNITED STATES PATENT OFFICE
CERTIFICATE OF CORRECTION

Patent No. 3,634,623 Dated January 11, 1972

Inventor(s) Renville H. McMann, Jr. & Donald W. Ridley

It is certified that error appears in the above-identified patent and that said Letters Patent are hereby corrected as shown below:

Col. 1, line 40, "gating systems" should be --gating. Systems--. Col. 3, line 32, after "screen" should be --and--; line 53, after "signal" (first occurrence) delete --is--. Col. 4, line 49, "differential" should be --from--; line 56, "THus," should be --Thus,--; line 63, "through" should be --though--. Col. 6, line 23, "evenly" should be --unevenly--.

Signed and sealed this 1st day of August 1972.

(SEAL)
Attest:

EDWARD M.FLETCHER,JR. ROBERT GOTTSCHALK
Attesting Officer Commissioner of Patents